(12) United States Patent
van de Bruggen

(10) Patent No.: US 9,407,719 B2
(45) Date of Patent: Aug. 2, 2016

(54) BATCH CONNECT

(71) Applicant: LinkedIn Corporation, Mountain View, CA (US)

(72) Inventor: Hans van de Bruggen, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 428 days.

(21) Appl. No.: 13/790,059

(22) Filed: Mar. 8, 2013

(65) Prior Publication Data

US 2014/0214946 A1    Jul. 31, 2014

Related U.S. Application Data

(60) Provisional application No. 61/758,601, filed on Jan. 30, 2013.

(51) Int. Cl.
*G06F 15/16* (2006.01)
*H04L 29/08* (2006.01)
*G06Q 10/10* (2012.01)
*G06Q 50/00* (2012.01)

(52) U.S. Cl.
CPC ............ *H04L 67/306* (2013.01); *G06Q 10/105* (2013.01); *G06Q 50/01* (2013.01)

(58) Field of Classification Search
CPC ....... G06N 99/005; G06N 5/04; G06Q 10/06; G06Q 10/10; H04L 67/306

USPC ......................................................... 709/204
See application file for complete search history.

(56) References Cited

U.S. PATENT DOCUMENTS

| | | | |
|---|---|---|---|
| 2008/0059576 A1* | 3/2008 | Liu ................. | G06Q 10/10 709/204 |
| 2008/0077574 A1* | 3/2008 | Gross .............. | G06F 17/30699 |
| 2011/0173198 A1* | 7/2011 | Malleshaiah ..... | G06F 17/30867 707/737 |
| 2012/0144308 A1* | 6/2012 | Welingkar ........ | G06Q 30/02 715/738 |

* cited by examiner

*Primary Examiner* — Jude Jean Gilles
*Assistant Examiner* — Jaren M Means
(74) *Attorney, Agent, or Firm* — Schwegman Lundberg & Woessner, P.A.

(57) ABSTRACT

Disclosed in some examples is a method including determining a set of recommended connections for a member of a social networking service based upon a recommendation criteria; presenting the set of recommended connections to the member; receiving from the member a selection of a set of target members; and for each particular member in the set of target members: determining a second set of recommended connections for the particular target member, the second set of recommended connections based upon the recommendation criteria and based upon the set of target members; and sending a notification to the particular member, the notification including the second set of recommended connections.

21 Claims, 5 Drawing Sheets

FIG. 1

BATCH CONNECT

CLAIM OF PRIORITY

This patent application claims the benefit of priority, under 35 U.S.C. Section 119(e), to U.S. Provisional Patent Application Ser. No. 61/758,601, entitled "BATCH CONNECT," filed on Jan. 30, 2013 to Hans van de Bruggen, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, Inc, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 shows an interface for providing batch connect recommendations according to some examples of the present disclosure.

DETAILED DESCRIPTION

Figure 2:
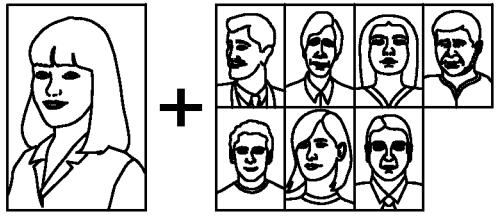
FIG. 2 shows a notification according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service.

A social networking service is an online service, platform or site that allows members of the service to build or reflect social networks or social relations among the members. Typically, members construct profiles, which may include personal information such as the member's name, contact information, employment information, photographs, personal messages, status information, links to web-related content, blogs, and so on. Generally, only a portion of a members profile may be viewed by the general public, and/or other members.

In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes. A connection is generally formed using an invitation process in which one member "invites" a second member to form a link. The second member than has the option of accepting or declining the invitation.

In general, a connection or link represents or is otherwise associated with an information access privilege, such that a first person who has established a connection with a second person is, via the establishment of that connection, authorizing the second person to view or access non-publicly available portions of their profiles which may include communications they have authored (e.g., blog posts, messages, "wall" postings, or the like). Of course, depending on the particular implementation of the business/social networking service, the nature and type of the information that may be shared, as well as the granularity with which the access privileges may be defined to protect certain types of data may vary greatly.

Some social networking services may offer a subscription or following model instead of, or in addition to the connection model. A subscription or following model is where one member "follows" another member without mutual agreement. Typically in this model, the follower is notified of public messages and other communications posted by the member that is followed. An example social networking service that follows this model is Twitter, a micro-blogging service allows members to follow other members without explicit permission.

In order to encourage users to form vibrant social communities, social networks may provide recommendations to users of other members which they may like to establish a connection with. For example, the system may recommend that a member connect with current or former classmates, current or former co-workers, or others. While recommendations may encourage members to add connections to their social networks, such recommendations are typically on a member by member basis. That is, the member must determine connection suitability and perform the connection process for each recommended member they are interested in connecting with one connection at a time. This may work well when the member is simply interested in adding one or two members, but for newer members who may wish to add lots of connections and for established members wishing to quickly bolster their network, it is somewhat cumbersome. Moreover, this process completely ignores the group dynamic of connections. That is, people are often associated through various logical groups and the desire to connect may be motivated in part through common membership in this logical group. The individual connection process fails to account for the fact that members in this logical group may all wish to connect to each other. For example, Jim may know Jack and Jill from their past employment history, as a result it is reasonable to infer that Jack and Jill know each other as well and would like to connect. The individual connection mechanism does not effectively inform Jack and Jill that they may wish to connect.

Disclosed in some examples are methods, systems, and machine readable media which provide a batch connection functionality on a social networking service. The batch connection functionality provides a member of a social networking service with a plurality of connection recommendations and allows the member to send connection invitations to all (or a subset) of those recommended connections simultaneously. For example, the member may be presented with a dialog box which may list a number of other members which the system has determined that the member is likely to wish to connect with. The member may send invitations to all, or a subset of, those recommended members through a minimal amount of effort (e.g., by clicking a single button). As part of, or in addition to the invitations sent, a notification may be sent to those recommended members who were invited to connect that they may also want to simultaneously connect with some or all of the same or similar recommended group of members (excluding in some examples, members to which they are already connected and themselves). The system may then provide those invited recommended members with an interface to batch connect with that group and in some examples, with additional groups (e.g., groups at other companies, schools, and the like). Any connections to which the invited recommended member selects to send an invitation to may also get a notification and their own batch connect interface, and so on. This creates a viral connection process where groups of connections may be formed quickly and easily.

Connection recommendations may be members of a social networking service that are not already connected to the member to whom the recommendation is made, may be members who are already connected to the member to whom the recommendation is made but who are not already connected to all of each other, or a mix of both. For example: John may be presented with a group ten coworkers from a company he's worked at. In this example, he's connected to all of these coworkers already, including Zoe. However, Zoe is not connected to anyone else in the group. John can select all ten members, and the system will contact all ten members using the batch connect process which will give the other nine coworkers an opportunity to connect with Zoe, and Zoe would have the ability to add some (or all) of these coworkers with a batch action. In this example, none of the coworkers would receive an invitation to connect to John, because they're already connected. In other examples, John can put both connections and non-connections in a group, and the non-connections would all receive invitations to connect. In some examples however, the system may wish to limit the recommendations to members that John has not already connected with. Thus connection recommendations may be considered in terms of the group as a whole, or in terms of the member to whom the recommendation is being made.

Figure 1:
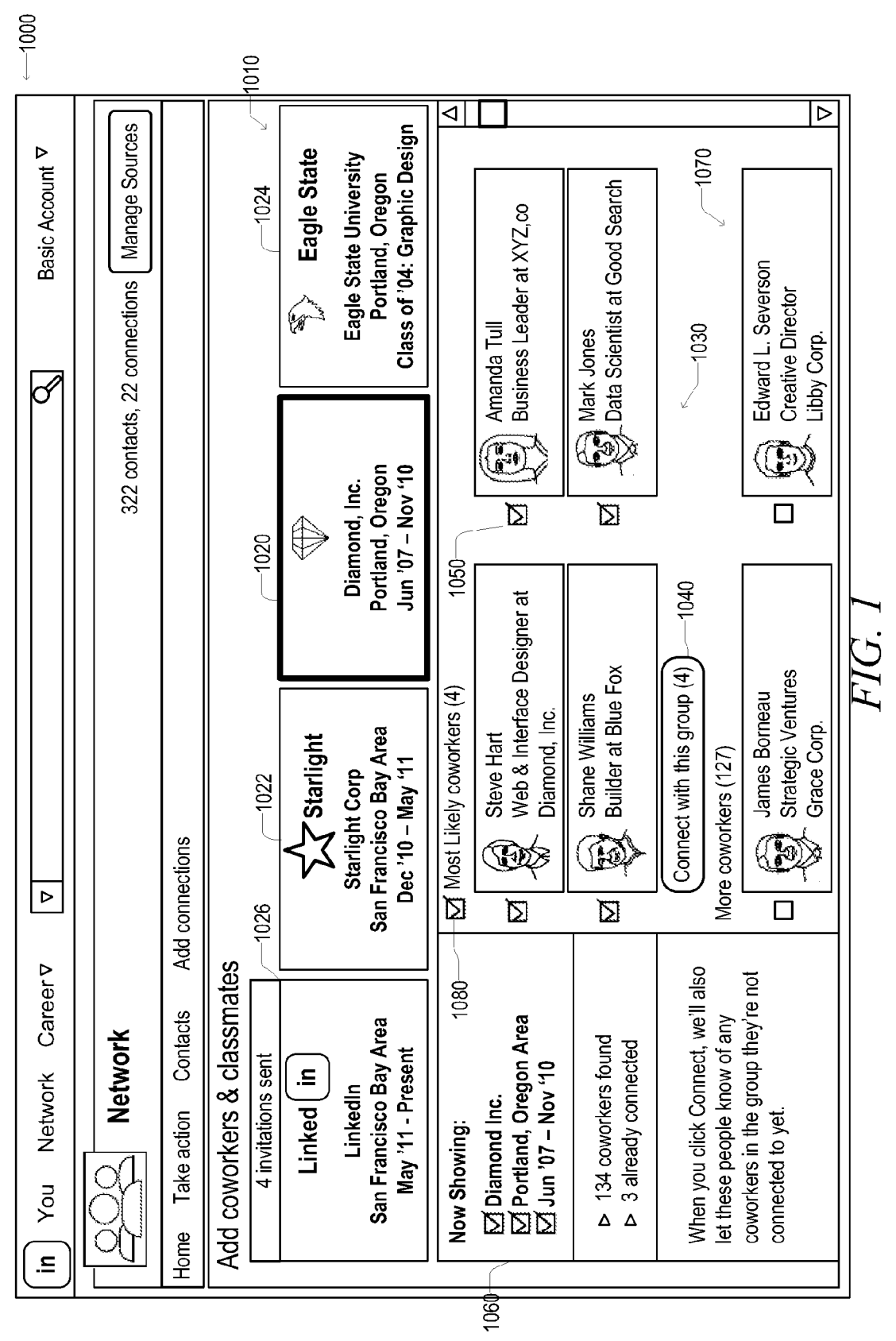

Turning now to FIG. 1, an example batch connect user interface is shown. At row 1010 a number of different recommendation criteria are shown. Recommendation criteria may be any criteria used to recommend members and may include one or more member profile attributes. A member profile attribute may be any biographical information about the member stored in their member profiles and may include such items as schools attended, majors or emphasis of study at those schools, attendance dates, locations (e.g., schools may have multiple locations), employment history including employer, dates of employment, job titles, location of employment, past residences, scholarly research, membership in an organization, skills that the member lists on their profiles, or the like. In FIG. 1 for example, recommendation criteria 1020 is employment at Diamond Inc., during a particular time frame and in a particular area. Other boxes 1022, 1024, and 1026 show other recommendation criteria in the form of past or present employments associated with the member or past attendance at schools (e.g., Eagle State University) during certain time frames and certain locations. Other recommendation criteria may also be used, including that the member is not already connected to the particular member under consideration for recommendation, or that the group of recommended members are not already all connected to each other.

Based on the currently selected recommendation criteria 1020 (in FIG. 1 this is employment at Diamond during the listed timeframe and selected location), the system has determined a plurality of recommended connections 1030, 1070. These recommended connections may be made based upon determining a list of members that meet the recommendation criteria (e.g., they have the selected member profile attributes). Note that as shown in FIG. 1, the recommendation criteria comprises several member profile attributes. For example, in FIG. 1, three profile attributes were used: company name (e.g., based on the box 1020-1026 selected), employment location 1060, and employment date range 1060. In some examples, a member must have all three profile attributes to be recommended to another member. In the example of the employment date range, the member must have worked at that employer at some point within that date range to be recommended.

In some examples, the system may also sort the recommended connections based on a relevance criteria which may be used to determine the relevance of the recommended connection to the member. For example, the recommended connections may be sorted into a first group of members 1030 which the system determines as the most relevant recommendations and a second group of recommended connections 1070 which may be deemed less relevant based upon the relevance criteria. The relevance criteria may be a simple Boolean check—i.e., does the recommended member meet this particular relevance criteria? If the answer is yes, then the recommended member may be placed in the first group 1030, if not, the recommended member may be placed in the second group 1070.

In some examples, a relevance criterion may include requiring that the recommended connection match a particular profile attribute. In these examples, a determination has been made that a particular profile attribute which is met indicates higher relevance than when the particular profile attribute is not met. Note that this is in contrast to the recommendation criteria. The recommendation criteria may be used to determine which members are recommended, whereas the relevance criteria may determine how those recommended members are presented.

Another example relevance criterion may be a connection degree threshold. For example, for a recommended connection to be part of group 1030, the member may have to be a connected within a certain degree (e.g., a second degree connection) with the recommended member in order to be part of group 1030. A social networking service may represent the connections of its members as a social graph having nodes and edges. The nodes may represent different entities and the edges represent various associations or relationships between entities. A degree may represent the number of edges connecting the node representing the member and the node representing the recommended member.

The relevance criteria may also be a numerical or quality score. In these examples, the recommended connection may need to have a relevance score above a predetermined threshold value in order to be included in group 1030. In other examples, the threshold value may be dynamic in order to maintain a desired amount of connections in group 1030. For example, if a large amount of connections meet the threshold, then the threshold may be raised (e.g., connections need to be more relevant to be included in group 1030). Within each group 1030, 1070, the recommend connections may be sorted based upon a relevance score.

An example relevance score may be connection strength between the member and the recommended member. A connection strength may be a score which reflects the overall strength (or relevance) of a path on the graph connecting the member with the recommended connection. The edges of the social graph between nodes may be weighted to reflect the relationship between the nodes. For example, one weight may apply to two nodes who are members who are directly connected to each other. Another weight may reflect a connection between a member and an institution (such as a school or company). Another weight may reflect one member is following another member. Yet another weight may be based upon messages or other communications exchanged between the nodes. The connection strength in some examples may be the sum of the edge weights of the path between two nodes. Members who have a connection strength to the recommended member above a predetermined threshold may be included in the group of most relevant recommendations 1030.

The boxes 1020, 1022, 1024, and 1026 select different sets of recommendations based upon different recommendation criteria. Selecting the "connect with this group" button 1040 may send invitations to connect to all the recommended members shown at area 1030. In some examples, and as shown in FIG. 1, selection boxes (e.g., check boxes, radio buttons, or the like) may be provided next to each recommended connection. For example, check box 1050. By selecting or deselecting the selection box, the member may control which members of the group are sent invitations. Those members whose selection box is unchecked will not receive invitations and may be excluded from sent batch invitations. In some examples, all the recommended members in the most relevant group 1030 may be selected by default (with the member being able to deselect any of these recommended members) while recommended members in group 1070 may be deselected by default and individually selectable if desired. In other examples recommended members in group 1070 may be selected by default. In still other examples, there may be a select all or clear functionality (e.g., a button 1080) which may through a single action (e.g., a single button click) select or clear all the recommended members in group 1030, group 1070, or both. Button 1040 may send notifications to any members selected in groups 1030 and 1070. In other examples, there may be different buttons for sending the notification for groups 1030 and 1070.

If the member chooses to connect with one or more of the members in the group 1030 or 1070 using button 1040, the recommended connections in groups 1030, 1070, or both might be updated with new recommended connections. For example, the system may promote those deemed relevant enough to be included in group 1070 but not relevant enough to make it to group 1030 the first time. For example, the relevance criteria or score necessary to move from group 1070 to group 1030 may be lowered or relaxed. In other examples, the system may move on to a different selection criteria (e.g., 1024) automatically. Thus allowing the user to click through the systems recommended connections relatively quickly.

While FIG. 1, showed recommendations generated based on employer, dates and locations of past or present employment, other example profile attributes may be used instead of, or in addition to those such as: job titles, schools attended, majors or emphasis of study at those schools, attendance dates, location (e.g., schools may have multiple locations), employment history including employer, dates of employment, job titles, location of employment, past residences, scholarly research, membership in an organization, skills that the member lists on their profiles, or the like.

In some examples, the system may automatically, and dynamically change the recommendation criteria. For example, the system may add, remove, or change member profile attributes used as recommendation criteria when recommending connections. For example, large employers, universities, or any other profile attribute that is shared by a large group of members may result in a large amount of recommended connections. For example, attendance at a large university during a four year span might turn up thousands of potential connections. Most of these potential connections are not going to be relevant to the member. To increase relevance, the system may filter out less relevant recommendations using a second member profile attribute. In some examples, this second member profile attribute may be related to the first member profile attribute. For example at 1024, the system has included the member's major ("graphic design") in the recommendation criteria to increase the relevance of the search results. In some examples, the system may reduce the number of criteria used to increase the amount of recommended connections. For example, in a small company, the chances two employees know each other regardless of position or location increases.

In some examples, the member may be shown the list of recommendation criteria. For example, in FIG. 1, at 1060, the member is shown the member profile attributes (or a portion of them) used, specifically employees of Diamond, Inc. who worked in the Portland Oreg. area between June 2007 and November 2010. As shown, a number of selection boxes may be used by the user to expand or narrow the list of recommended connections. For example, deselecting June 2007-November 2010 may expand the list to include members working at Diamond in Portland anytime. In yet other examples involving dates of attendance, employment, or the like, the system may narrow the list of recommended members (and increase relevance) by increasing the length of time that the employment date ranges of the member and the recommended connection must overlap to increase the likelihood that the member would know the recommended member.

As described, the recommendation criteria are used by the system to generate the recommended members. For example, members (e.g., their profile attributes) may be recommended based upon a match of recommendation criteria (e.g., desired profile attributes). Other example recommendation and relevance criteria may factor in analysis of the member's social graph. For example, the system may recommend 2nd degree connections to which the member has a lot of 1st degree connections in common. For example, if Jack is connected to Jill and Bill, and John is connected to both Jill and Bill but Bob is only connected to Jill, assuming other criteria are met (e.g., employment or other common criteria), the system may recommend John but not Bob as John has 2 first degree connections in common with Jack and Bob has only one. The recommendation and relevance criteria may also be based upon the so-called "shortest path" in which the system determines relevant members by comparing the length of the path between the member and the potential recommended members. Those members with short paths may be recommended, whereas those with longer paths may not be recommended. This path may include just paths through members, but also paths through organizations (which may be represented as nodes in the graph as well).

Turning now to FIG. 2, an example notification sent to the members selected through the batch connect process is shown. Message 2000 is generated when a member (for ease of description the "initiating member") selects one or more members to connect with through the batch connect process (for ease of description the target of the message may be referred to as "target members"). This message may encourage the target members to complete a connection with the initiating member (if they are not already connected) and encourages the target member to invite other members in the set of target members. At 2010 the header indicates that the initiating member is sending invitations to connect to all the displayed target members based on the identified member profile attributes. At 2020 the other target members which have received invitations from the initiating member that are not already connected with this particular target member are shown and the notification may urge the particular target member to whom the notification is sent to connect with them. In order to connect, the recipient member may click the "continue" link 2030 in the email.

Pressing the continue link 2030 may take the recipient target member to a screen such as that shown in FIG. 1 (except it would be customized for the particular target member). The target member may then proceed to send connection invitations to selected members simultaneously. If the selected member is the initiating member, the invitation from the initiating member is accepted. The invited members get another notification and the process continues virally. In other examples, the notification (e.g., an email) may contain similar functionality as the interface displayed in FIG. 1. For example, the page may contain selection boxes which allow the recipient to complete the process without having to visit a screen such as that shown in FIG. 1. In some examples, a plug in or other application may be necessary to enable this functionality at the target member's computing system.

Note that in some examples the recommended connections sent to the target members may be the set of members that the initiating member sent invitations to in the batch connect process excluding the set of those members that are already connected to the recipient and the recipient himself or herself. In other examples, this set may be expanded or contracted based on differing member profile attributes of the recipient. For example, the initiating member's recommendation criteria may have been based upon employment at a particular company during a particular time period. The target member may have worked at the company during overlapping, but different, time periods. This may create new recommendations including members who worked at the company during a time period overlapping the target member but not the initiating member, or lead to removal of recommendations for the target member where the recommended member's employment dates did not overlap that of the target member.

Once the target recipient selects the members they want to connect with, another email, such as that in FIG. 2 may be sent to those connections and so on. To avoid sending members too many of these emails (which would likely be repetitive), the system may only send a single email per member for each unique batch connect process. Thus for example, if the target member who received the notification shown in FIG. 2 sends invitations to the individuals shown in 2010, those individuals (having already received a similar notice as shown in FIG. 2) would not receive a second notification (regular invitation notifications may still be sent though). In addition, if a large number of potential connections are all participating in the batch connect process, members could potentially get many of these emails from different batch connect processes. In some examples, the system may aggregate the batch connect emails to a particular recipient member over a predetermined time period. Thus a member would get a single email every so often with all batch connect information in the single email to avoid overloading the member.

Another potential problem arises because so many members may be connecting at the same time and as each connection requires an invitation message (which may or me not be included as part of the notification) members may become overwhelmed with the volume of invitation notification as well. Take for instance the example of FIGS. 1 and 2, there are up to 7 potential invitations checked. Thus each member may get seven invitations from this one batch connect process alone and the email invitations may become excessive to the member. In some examples, the system may aggregate the invitations sent for a particular batch connect process for a particular period and then send out one batch invitation.

This batch connect process may be especially useful for new member startup to integrate a new member into the social networking service quickly by establishing their connections in a semi-automated fashion. The batch connect process may be included in a member sign up flow. For example, a new member may sign up for the social networking service giving basic biographical information (name, past employment or education, or the like) and setting up account information (e.g., username, password, and the like). Once the basics are inputted, the system may use the basic information to recommend members to connect with.

Figure 3:
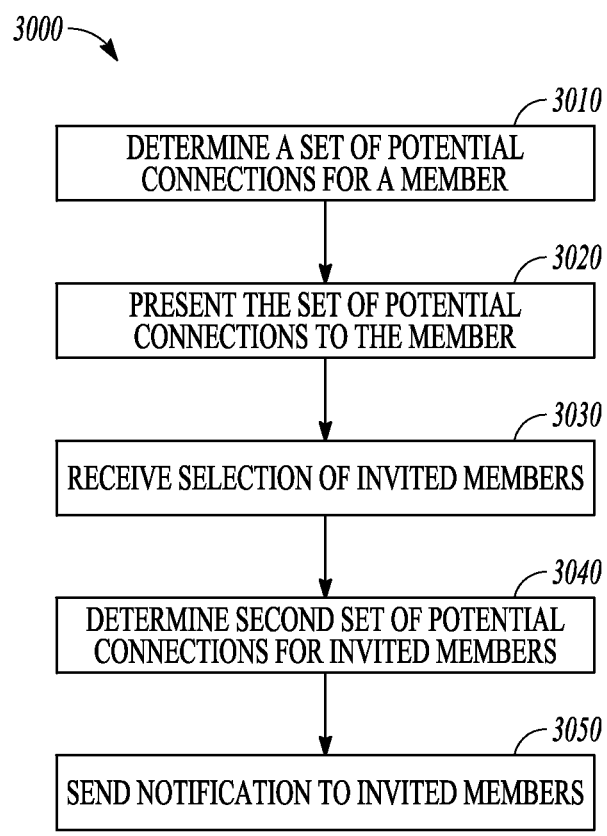
FIG. 3 shows a flowchart of a method for providing a batch connect functionality according to some examples of the present disclosure.

Turning now to FIG. 3 a method of batch connecting members of a social networking service is shown. At operation 3010 a set of potential connections for a member may be determined. As noted previously the potential connections may be determined from the pool of all members of the social networking service based upon recommendation criteria. Example recommendation criteria may include member profile attributes. In these examples, members to be recommended may be selected from the pool of all members of the social networking service based on matching the member profile attributes of the recommendation criteria to the member profile attributes of the members in the pool. For example, employment at LinkedIn may be a first recommendation criterion and a time frame of that employment may be a second recommendation criterion. The system may then recommend all members who have a member profile attribute corresponding to employment at LinkedIn and a member profile attribute of having worked there during the specified time frame.

The recommendation criteria may be determined by the member for whom the recommendation is being made, an administrator for the social networking service, or both the member and the administrator may provide input on one or more criterion used. For example, the administrator may define a plurality of allowable recommendation criteria that the member may then select from. As already noted, in some examples, the system may dynamically add or remove criteria (such as related profile attributes) to increase the relevance of the recommendations. These dynamic modifications to the recommendation criteria may be implemented by one or more rules created by an administrator, a member, or the like. For example, the rules may specify one or more thresholds and one or more additional recommendation criteria to apply if the number of recommended connections exceeds that threshold.

At operation 3020 the recommended set of potential connections may be presented to the member. In some examples, this may be done using a user interface (UI) such as shown in FIG. 1. This UI may be (or be part of) a webpage. For example, the UI may be displayed as a page on the social networking service. In other examples this interface may be provided using one or more applications. For example, a desktop application that may interface with the social networking service. In other examples the application may be a mobile application designed to run on a mobile device such as a smartphone which may interface with the social networking service. The presentation may show various profile attributes of the recommended members. For example, their name, their profile photo, the matching profile attributes, skills listed in their member profiles, or the like. The recommended set of potential connections may be grouped or ranked based upon relevance using relevance criteria or scores. The more relevant recommendations may be displayed more prominently and may be selected by default whereas the recommendations that are less relevant may be deselected by default and may be displayed less prominently.

At operation 3030 the member may select the recommended members to send invitations or notifications to. For example, the system may receive selections through user input into a check box, radio button, or similar input of the UI. The system may then receive an indication that the member is satisfied with the currently selected members and wishes to connect with the selected members. The members that are selected may now be referred to as the target members. In some examples, the system may then determine a second set of potential connections for each one of the target members (e.g., the set of members who were sent invitations to connect) at operation 3040. For example, the second set may be the original set without the target member (in some examples, you may not want to recommend someone connect with themselves) and without any member that is already connected to the target. In other examples, the list may be expanded or contracted as already explained.

At operation 3050, the target members may be notified that they were invited to connect with the initiating member (if they are not already connected), and in some examples, may be presented with the recommendations generated in operation 3040. The invitation and the notification regarding the recommendations may be the same or a separate notification. In some examples, operation 3040 is not performed and the users may simply get an invitation to connect from the initiating member. The notifications during a predetermined time period for a particular member may be batched together to prevent overloading members with invitation requests, connection recommendations, or both. As already noted, the system may take proactive measures to limit the messaging associated with the batch connect process.

Figure 4:
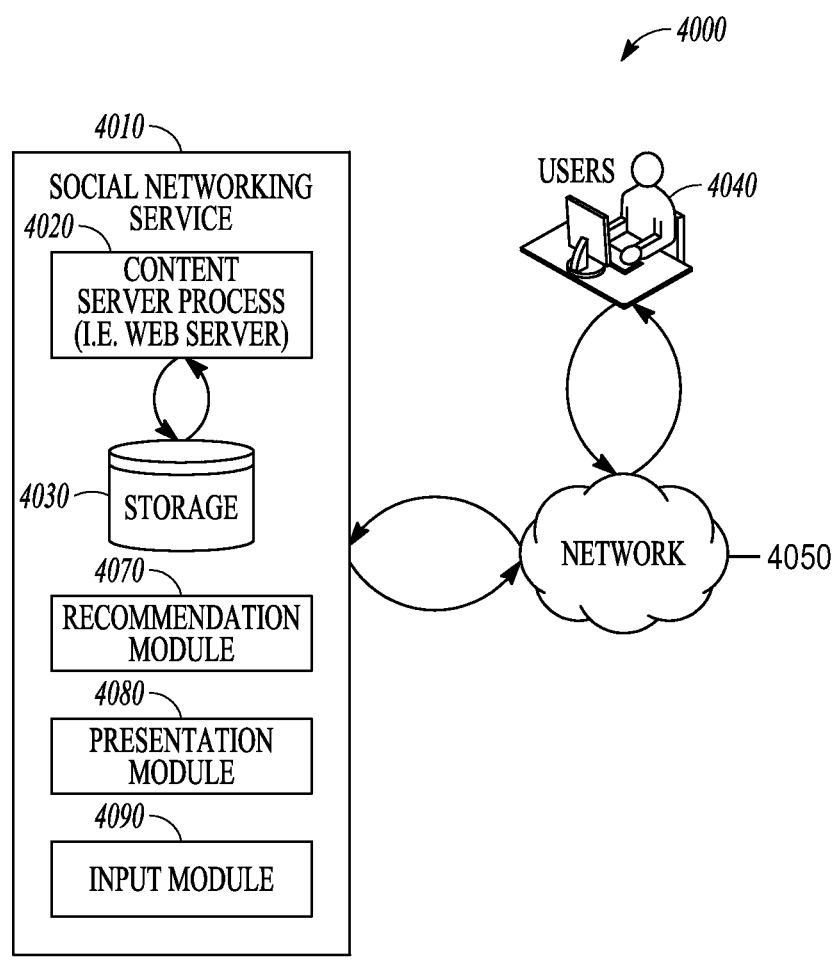
FIG. 4 shows a schematic of a system for providing a batch connect according to some examples of the present disclosure.

FIG. 4 shows an example system 4000 for providing a social networking service and for providing batch connection features. Social networking service 4010 may contain a content server process 4020. Content server process 4020 may communicate with storage 4030 and may communicate with one or more users 4040 through a network 4050. Content server process 4020 may be responsible for the retrieval, presentation, and maintenance of member profiles stored in storage 4030. Content server process 4020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 4040.

Users 4040 may include one or more members, prospective members, or other users of the social networking service 4040. Users 4040 access social networking service 4010 using a computer system through a network 4050. The network may be any means of enabling the social networking service 4010 to communicate data with users 4040. Example networks 4050 may be or include portions of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Recommendation module 4070 may generate connection recommendations for a member based upon recommendation criteria (e.g., one or more selected member profile attributes). The recommendations may be for the initiating member or for one of the target members. The particular recommendation criteria to use for creating the recommendations may be selected by the member, the system (e.g., based upon recommendation criteria configured by an administrator of the social networking service), or the like. The recommendation module may determine an initial recommended list of members and then compare the list of recommended members to a predetermined threshold. If the recommended list of members is larger than the threshold, the recommendation module may add additional recommendation criteria to remove members from the list of recommended members. Additional recommendation criteria (e.g. an additional member profile attribute) may be related to the other recommendation criteria. For example, a sub-attribute of the member profile attribute. A sub-attribute of a member profile attribute further defines information about the member profile attribute. For example, a member profile attribute may be that a member worked for LinkedIn and a sub-attribute is that the member worked for LinkedIn during a certain time frame. Another sub-attribute may be that the member worked in a certain LinkedIn location or for a certain group at LinkedIn. In some examples, recommendation module 4070 may determine which of the recommended connections are most relevant based on relevance criteria. The most relevant connections may be displayed more prominently.

Presentation module 4080 may generate the presentations to show to members the recommendations generated by the recommendation module, and to notify target members. For example, presentation module 4080 may produce the user interface of FIG. 1 and the notification of FIG. 2. These presentations may take any suitable form such as: emails (which may be sent by the presentation module), web-pages, data for applications on the client's computing system 4040 that cause a presentation such as those shown in FIG. 1 and FIG. 2 to be displayed, modifications to user profiles stored in storage 4030 or the like. The presentation module 4080 may interact with the content server process 4020 in order to achieve these functions.

Input module 4090 may receive and process input from members regarding the set of recommended connections. The input module 4090 may work with the presentation module 4080 to notify users of invitations and recommendations. Input module 4090 may also work with recommendation module 4070, presentation module 4080 and content server process 4020 to achieve these functions. Input module 4090 may also receive input on which member profile attributes to use to generate the recommendations.

The functionality of the recommendation module 4070, presentation module 4080, input module 4090, content server process 4020 and storage 4030 may be implemented by any one of the aforementioned modules. Thus while a module is described as performing certain functionality, one skilled in the art with the benefit of Applicant's disclosure may appreciate that other modules may perform that functionality instead of or in addition to the module described herein.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
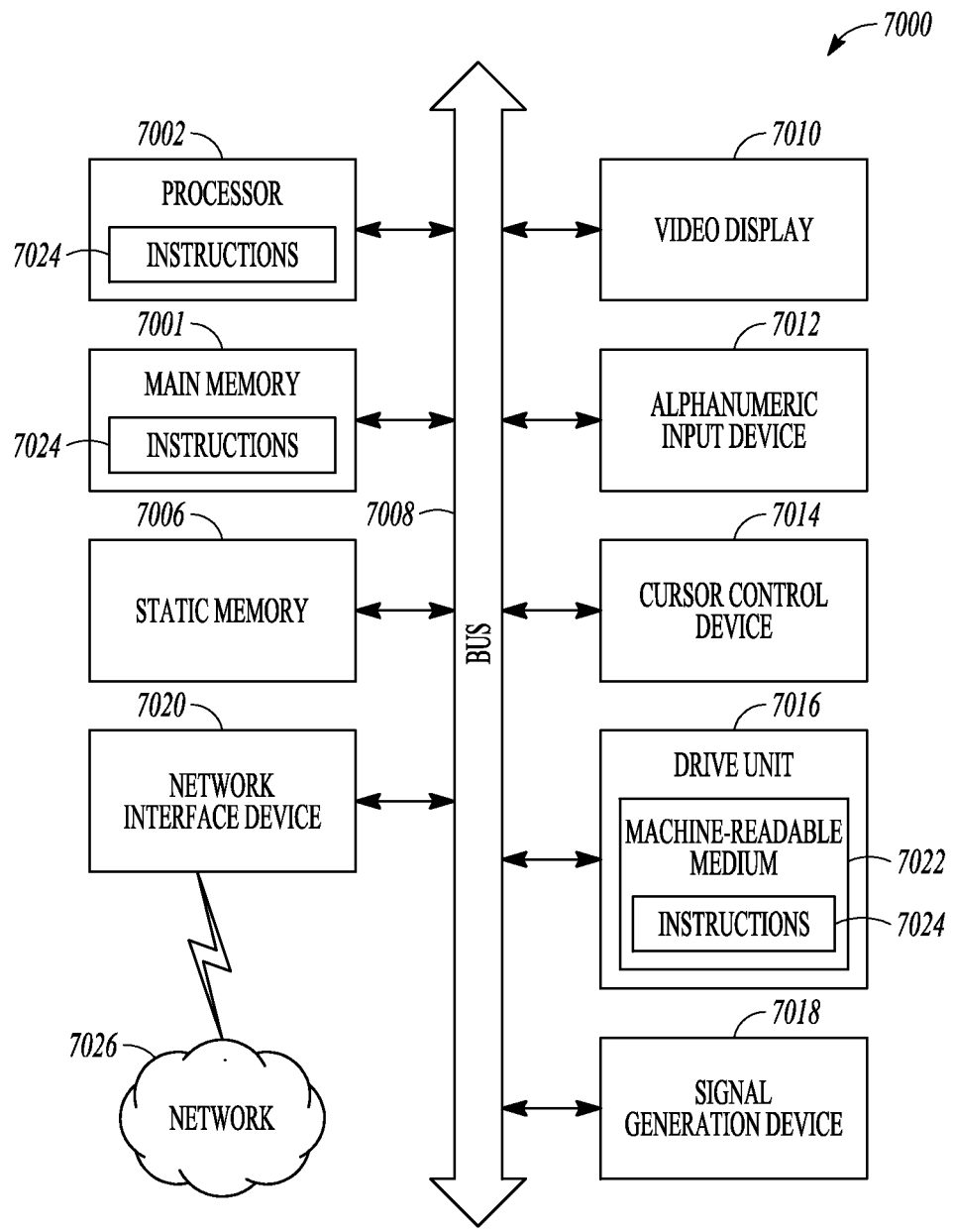
FIG. 5 shows a schematic of a machine according to some examples of the present disclosure.

FIG. 5 is a block diagram of machine in the example form of a computer system 7000 within which instructions, for causing the machine to perform any one or more of the methodologies discussed herein, may be executed. For example, any one of the components shown in FIG. 4 may be or contain one or more of the components described in FIG. 5. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 5 or only a subset of the components shown in FIG. 5.

The example computer system 7000 includes a processor 7002 (e.g., a central processing unit (CPU), a graphics processing unit (GPU) or both), a main memory 7001 and a static memory 7006, which communicate with each other via a bus 7008. The computer system 7000 may further include a video display unit 7010 (e.g., a liquid crystal display (LCD) or a cathode ray tube (CRT)). The computer system 7000 also includes an alphanumeric input device 7012 (e.g., a keyboard), a cursor control/user interface (UI) navigation device 7014 (e.g., a mouse), a disk drive unit 7016, a signal generation device 7018 (e.g., a speaker) and a network interface device 7020.

Machine-Readable Medium

The disk drive unit 7016 includes a machine-readable medium 7022 on which is stored one or more sets of instructions and data structures (e.g., software) 7024 embodying or used by any one or more of the methodologies or functions described herein. The instructions 7024 may also reside, completely or at least partially, within the main memory 7001, static memory 7006, and/or within the processor 7002 during execution thereof by the computer system 7000, the main memory 7001 and the processor 7002 also constituting machine-readable media.

While the machine-readable medium 7022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 7024 may further be transmitted or received over a communications network 7026 using a transmission medium. The instructions 7024 may be transmitted using the network interface device 7020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 7020 may wirelessly transmit data and may include an antenna.

Examples

1. A method including determining a set of recommended connections for a member of a social networking service, the set of recommended connections being a plurality of other members of the social networking service selected based upon a recommendation criteria; presenting the set of recommended connections to the member; receiving from the member a selection of a set of target members, the set of target members being a plurality of members selected from the set of recommended connections; and for each particular member in the set of target members: determining a second set of recommended connections for the particular target member, the second set of recommended connections based upon the set of target members; and sending a notification to the particular member, the notification including the second set of recommended connections.

2. The method of example 1, wherein the recommendation criteria includes a social networking profile attribute, and wherein determining a set of recommended connections includes selecting members for the set of recommended connections that have social networking profile attributes that match the social networking profile attribute.

3. The method of example 2, comprising: determining that the number of members in the set of recommended connections for the member is greater than a predetermined threshold; and excluding from the set of recommended connections, members in the set of recommended connections who do not match a second social networking profile attribute.

4. The method of example 3, wherein the second social networking profile attribute is a related attribute to the social networking profile attribute.

5. The method of example 1, wherein the second set of recommended connections includes each of the plurality of members in the set of target members to which that particular target member is not already connected to.

6. The method of example 1, wherein the notification includes an email, the email containing a link to a page on a social networking site where the second set of recommended connections are presented and the method comprises receiving from the particular member a selection of a second set of target members, the second set of target members being a plurality of members selected from the second set of recommended connections.

7. The method of example 1, wherein the second set of recommended connections includes a second member not in the set of target members.

8. A system including a recommendation module configured to determine a set of recommended connections for a member of a social networking service, the set of recommended connections being a plurality of other members of the social networking service selected based upon a recommendation criteria; a presentation module configured to present the set of recommended connections to the member; an input module for receiving from the member a selection of a set of target members, the set of target members being a plurality of members selected from the set of recommended connections; the recommendation module further configured to determine, for each particular member in the set of target members, a second set of recommended connections for the particular target member, the second set of recommended connections based upon the set of target members; and the presentation module further configured to send, for each particular member in the set of target members a notification to the particular member, the notification including the second set of recommended connections determined by the recommendation module for that particular member.

9. The system of example 8, wherein the recommendation criteria includes a social networking profile attribute, and wherein the recommendation module is configured to determine a set of recommended connections by at least selecting members for the set of recommended connections that have social networking profile attributes that match the social networking profile attribute.

10. The system of example 9, wherein the recommendation module is configured to determine that the number of members in the set of recommended connections for the member is greater than a predetermined threshold and in response, exclude from the set of recommended connections, members in the set of recommended connections who do not match a second social networking profile attribute.

11. The system of example 10, wherein the second social networking profile attribute is a related attribute to the social networking profile attribute.

12. The system of example 8, wherein the second set of recommended connections includes each of the plurality of members in the set of target members to which that particular target member is not already connected to.

13. The system of example 8, wherein the notification includes an email, the email containing a link to a page on a social networking site where the second set of recommended connections are presented and wherein the input module is configured to receive from the particular member a selection of a second set of target members, the second set of target members being a plurality of members selected from the second set of recommended connections.

14. The system of example 8, wherein the second set of recommended connections includes a second member not in the set of target members.

15. A machine readable medium that stores instructions which when performed by a machine, cause the machine to perform operations comprising: determining a set of recommended connections for a member of a social networking service, the set of recommended connections being a plurality of other members of the social networking service selected based upon a recommendation criteria; presenting the set of recommended connections to the member; receiving from the member a selection of a set of target members, the set of target members being a plurality of members selected from the set of recommended connections; and for each particular member in the set of target members: determining a second set of recommended connections for the particular target member, the second set of recommended connections based upon the set of target members; and sending a notification to the particular member, the notification including the second set of recommended connections.

16. The machine-readable medium of example 15, wherein the recommendation criteria includes a social networking profile attribute, and wherein the instructions for determining a set of recommended connections includes instructions, which when performed by the machine cause the machine to perform operations comprising: determining the set of recommended connections by at least selecting members for the set of recommended connections that have social networking profile attributes that match the social networking profile attribute.

17. The machine-readable medium of example 16, wherein the instructions comprise instructions which when performed by the machine, cause the machine to perform the operations of: determining that the number of members in the set of recommended connections for the member is greater than a predetermined threshold; and excluding from the set of recommended connections, members in the set of recommended connections who do not match a second social networking profile attribute.

18. The machine-readable medium of example 17, wherein the second social networking profile attribute is a related attribute to the social networking profile attribute.

19. The machine-readable medium of example 15, wherein the second set of recommended connections includes each of the plurality of members in the set of target members to which that particular target member is not already connected to.

20. The machine-readable medium of example 15, wherein the notification includes an email, the email containing a link to a page on a social networking site where the second set of recommended connections are presented and the machine-readable medium includes instructions which when performed by the machine, cause the machine to perform operations comprising: receiving from the particular member a selection of a second set of target members, the second set of target members being a plurality of members selected from the second set of recommended connections.

21. The machine-readable medium of example 15, wherein the second set of recommended connections includes a second member not in the set of target members.

What is claimed is:

1. A method comprising:
    determining a set of recommended connections for a member of a social networking service, the set of recommended connections being a plurality of other members of the social networking service selected based upon a recommendation criteria;
    presenting the set of recommended connections to the member;
    receiving from the member a selection of a set of target members, the set of target members being a plurality of members selected from the set of recommended connections; and
    for each particular member in the set of target members:
        determining a second set of recommended connections for the particular member, the second set of recommended connections based upon the set of target members and including at least one of the target members; and
        sending a notification to the particular member, the notification including the second set of recommended connections.

2. The method of claim 1,
    wherein the recommendation criteria includes a social networking profile attribute, and
    wherein determining a set of recommended connections includes selecting members for the set of recommended connections that have social networking profile attributes that match the social networking profile attribute.

3. The method of claim 2, further comprising:
    determining that the number of members in the set of recommended connections for the member is greater than a predetermined threshold; and
    excluding from the set of recommended connections, members in the set of recommended connections who do not match a second social networking profile attribute.

4. The method of claim 3, wherein the second social networking profile attribute is a related attribute to the social networking profile attribute.

5. The method of claim 1, wherein the second set of recommended connections includes each of the plurality of members in the set of target members to which that particular target member is not already connected to.

6. The method of claim 1, wherein the notification includes an email, the email containing a link to a page on a social networking site where the second set of recommended connections are presented and the method comprises receiving from the particular member a selection of a second set of target members, the second set of target members being a plurality of members selected from the second set of recommended connections.

7. The method of claim 1, wherein the second set of recommended connections includes a second member not in the set of target members.

8. A system, comprising:
    a processor; and
    memory, the memory including instructions stored thereon which, when executed, cause the processor to:
        determine a set of recommended connections for a member of a social networking service, the set of recommended connections being a plurality of other members of the social networking service selected based upon a recommendation criteria;
        present the set of recommended connections to the member;
        receive from the member a selection of a set of target members, the set of target members being a plurality of members selected from the set of recommended connections;
        determine, for each particular member in the set of target members, a second set of recommended connections for the particular target member, the second set of recommended connections based upon the set of target members and including at least one of the target members; and
        send, for each particular member in the set of target members a notification to the particular member, the notification including the second set of recommended connections determined by the recommendation module for that particular member.

9. The system of claim 8,
    wherein the recommendation criteria includes a social networking profile attribute, and
    wherein the instructions further cause the processor to determine a set of recommended connections by at least selecting members for the set of recommended connections that have social networking profile attributes that match the social networking profile attribute.

10. The system of claim 9, wherein the instructions further cause the processor to determine that the number of members in the set of recommended connections for the member is greater than a predetermined threshold and in response, exclude from the set of recommended connections, members in the set of recommended connections who do not match a second social networking profile attribute.

11. The system of claim 10, wherein the second social networking profile attribute is a related attribute to the social networking profile attribute.

12. The system of claim 8, wherein the second set of recommended connections includes each of the plurality of members in the set of target members to which that particular target member is not already connected to.

13. The system of claim 8, wherein the notification includes an email, the email containing a link to a page on a social networking site where the second set of recommended connections are presented and wherein the input module is configured to receive from the particular member a selection of a second set of target members, the second set of target members being a plurality of members selected from the second set of recommended connections.

14. The system of claim 8, wherein the second set of recommended connections includes a second member not in the set of target members.

15. A non-transitory machine readable medium that stores instructions which, when performed by a machine, cause the machine to perform operations comprising:
    determining a set of recommended connections for a member of a social networking service, the set of recommended connections being a plurality of other members of the social networking service selected based upon a recommendation criteria;
    presenting the set of recommended connections to the member;

receiving from the member a selection of a set of target members, the set of target members being a plurality of members selected from the set of recommended connections; and for each particular member in the set of target members:
determining a second set of recommended connections for the particular target member, the second set of recommended connections based upon the set of target members and including at least one of the target members; and sending a notification to the particular member, the notification including the second set of recommended connections.

16. The machine-readable medium of claim 15,
wherein the recommendation criteria includes a social networking profile attribute, and
wherein the instructions for determining the set of recommended connections includes instructions, which when performed by the machine cause the machine to perform operations comprising:
determining the set of recommended connections by at least selecting members for the set of recommended connections that have social networking profile attributes that match the social networking profile attribute.

17. The machine-readable medium of claim 16, wherein the instructions comprise instructions which when performed by the machine, cause the machine to perform the operations of:

determining that the number of members in the set of recommended connections for the member is greater than a predetermined threshold; and
excluding from the set of recommended connections, members in the set of recommended connections who do not match a second social networking profile attribute.

18. The machine-readable medium of claim 17, wherein the second social networking profile attribute is a related attribute to the social networking profile attribute.

19. The machine-readable medium of claim 15, wherein the second set of recommended connections includes each of the plurality of members in the set of target members to which that particular target member is not already connected to.

20. The machine-readable medium of claim 15, wherein the notification includes an email, the email containing a link to a page on a social networking site where the second set of recommended connections are presented and the machine-readable medium includes instructions which when performed by the machine, cause the machine to perform operations comprising:
receiving from the particular member a selection of a second set of target members, the second set of target members being a plurality of members selected from the second set of recommended connections.

21. The machine-readable medium of claim 15, wherein the second set of recommended connections includes a second member not in the set of target members.

* * * * *